Dec. 18, 1956   A. WESP   2,774,242
CALORIMETER
Filed June 17, 1954
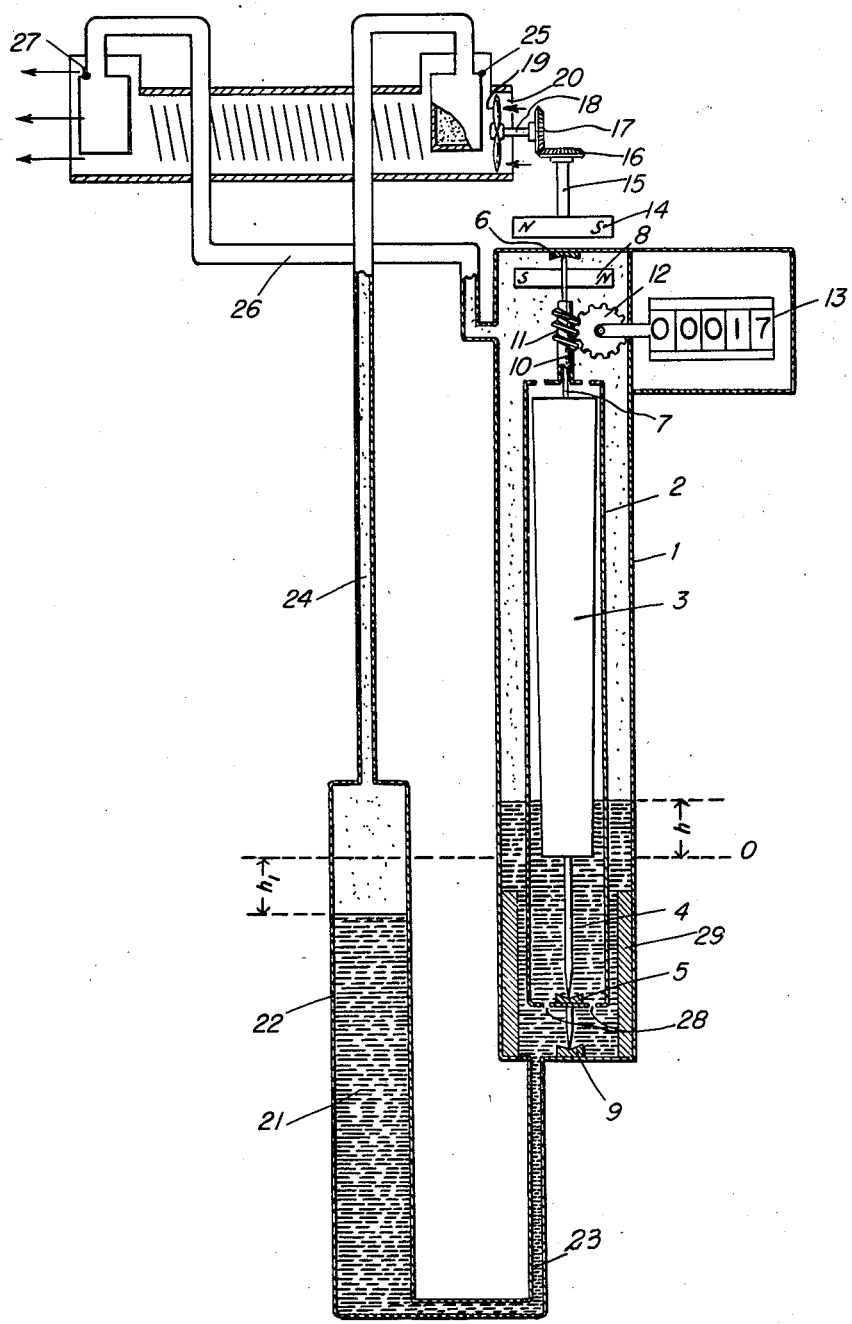
INVENTOR.
Adam Wesp
BY

United States Patent Office 2,774,242
Patented Dec. 18, 1956

2,774,242
CALORIMETER

Adam Wesp, Messenhausen, Germany, assignor to VDO Tachometer Werke, Adolf Schindling G. m. b. H., Frankfurt am Main, Germany, a corporation of Germany Application June 17, 1954, Serial No. 437,423

Claims priority, application Germany June 17, 1953

12 Claims. (Cl. 73—193)

This invention relates to a calorimeter and more particularly a calorimeter for measuring the quantity of heat in a heat carrier flowing through a central heating installation.

Calorimeters for central heating installations are known in which an impeller arranged in the supply pipe of the heat carrier and rotated by the flowing liquid drives a counting mechanism by means of a reduction gear which is automatically changed by means of liquid thermometers arranged in the inflow and outflow of the heat carrier. This very old proposal has however not been adopted in practice because it operates with too many troublesome parts, especially a friction wheel gearing.

Another proposal attempts to eliminate the defects of the mechanical reduction gear by replacing the latter by a liquid coupling. In that case sets of intermeshing plates at the ends of a driving and a driven shaft form a space which is meandering in shape and is filled with liquid. The number of revolutions of the driven shaft lags behind the number of revolutions of the driving shaft. By means of a constant damping of the driven shaft the slippage is kept constant for equal temperatures. If this liquid coupling is exposed to the temperature of the heat carrier, the number of revolutions of the driven shaft remains even further behind those of the driving shaft the higher the temperature of the heat carrier may be but in non-linear respect. The difference between the numbers of revolutions of the driving and driven shaft is taken as an approximate measure for the quantity of heat to be ascertained. To eliminate the non-linear dependence upon the changing viscosity of the liquid under temperature variation, the coupling of the two shafts is, according to the same proposal, made very strong, i. e. the cross section of the liquid chamber is made very small. It will be seen at once that such an arrangement can offer no accurate results, and that close coupling can lead only to frequent disturbances. Such calorimeters have also not been adopted in practice.

According to the present invention the mechanical transmission of the first proposal is replaced by a liquid coupling which depends directly on the difference of temperature between the inflow and outflow ends of the installation and which eliminates the temperature-dependent viscosity of the coupling liquid used for measuring in the second proposal. Thus, the present invention provides a simple, inexpensive construction which operates with sufficient accuracy for the desired calorimetric measurements for all practical purposes. The calorimeter has linear characteristics and is independent of the inflow temperature of the heat carrier, independent of extraneous sources of heat energy and independent of the temperature of the container in which the calorimeter is positioned.

According to the present invention an impeller in the inflow of the heating installation drives a cylinder, the revolution of which is transmitted by a liquid coupling to a second cylinder which drives a counting mechanism. In the liquid coupling, the level of the liquid between the two cylinders varies as a function of the difference of the temperature between the inflow and outflow of the heat carrier. The level of the liquid is controlled, for example, by means of an air or gas-filled chamber, arranged in both the inflow and outflow ends of the heating installation. A counterforce is applied in the form of a brake provided by a stationary cylinder surrounding the cylinder which drives the counting mechanism. The stationary brake cylinder may partly also be formed by the wall of the vessel. Moreover, the stationary cylinder or the wall of the vessel may be contracted or expanded, partially in sections, in order to equalize the non-linearity of the number of revolutions of the driven cylinder as a function of the difference of temperature of the inflow and outflow. The drive of the driving cylinder by the impeller is conveniently effected by means of a magnetic coupling through the wall of the vessel, so that the vessel containing the liquid coupling may be kept completely closed and so as to avoid passages for the shaft which cannot be kept tight during long runs.

The accompanying drawing illustrates schematically, in vertical section, one embodiment of the invention.

Thus, in a closed vessel 1, two coaxial cylinders 2 and 3 are rotatably mounted, one within the other. The inner cylinder 3, as here shown, is shorter and of smaller diameter than the outer cylinder 2. The inner cylinder is carried by an axial shaft, the lower end 4 of which is mounted in a point bearing 5 in the bottom of the outer cylinder 2. An upper point bearing 6 within the closed vessel 1 receives the upper end 7 of the inner cylinder shaft. A permanent magnet 8 is carried by the shaft end 7 closely adjacent the top of the closed vessel 1, for a purpose which will later appear. The outer cylinder 2 is also pivoted in a point bearing at its lower end, here illustrated as a vertical thrust bearing 9 in the bottom of the closed vessel 1. The upper end of the shaft of the outer cylinder 2 is formed as a sleeve 10 surrounding the upper end 7 of the shaft of the inner cylinder 3, and is externally formed as a worm 11 for driving a worm wheel 12 to actuate a counting mechanism 13. The inner cylinder 3 is rotated by the magnet 8 which is turned by a permanent magnet 14 carried by a driving shaft 15 outside of the vessel 1. The driving shaft 15 may be rigid or flexible, as required, and is coupled as by bevel gears 16 and 17 and a shaft 18 to an impeller 19 in the inflow 20 of the heat carrier passing through the central heating installation. Accordingly, the number of revolutions of the impeller may serve as a measure of the amount of heat flowing through the installation. Such revolution is carried through the shafts and beveled gears described to the permanent magnet 14, thereby turning the permanent magnet 8 and causing rotation of the cylinders to provide a measurement, as will presently be described.

The vessel 1 is one of two connecting vessels partly filled with a liquid 21. The other vessel 22 is connected to the vessel 1 through a conduit 23 extending from the bottom of one vessel to that of the other to provide a U-tube relationship between the two vessels. When the apparatus is not being operated, the liquid 21 is placed therein to stand at the level of the bottom of the inner cylinder 3 and will stand at the same level in each of the vessels. This level is indicated by the horizontal broken line O. The air space above the liquid in the second vessel 22 is connected by means of a tube 24 to a closed air or gas-filled chamber, in the supply line which feeds the heating installation. More conveniently, the closed air space 25 is illustrated in the drawing as being disposed at the inflow end of the heating installation. A second tube 26 connects the air space above the liquid 21 in the first vessel 1 to a second air or gas-filled chamber 27 in the outflow of the heating installation. The chambers 25 and 27 may be formed as a cylindrical vessel or tank. Instead of air-filled chambers vapor pressure chambers may be used. A rise in temperature of the heat carrier causes a definite increase in pressure within the chambers and, since the chamber walls in the illustrated embodiment are fixed, the difference in internal pressure between the inflow and outflow chambers is transmitted to the liquid, causing its level to fluctuate accordingly. If no heat carrier is flowing through the installation then the liquid stands at the level indicated by the horizontal broken line O in the drawing. However, if heat is being delivered to the installation, the air in the air spaces 25 and 27 expands; and the air in the first-named air space 25 is at higher temperature than that in the second air space 27, because heat is delivered with the heat carrying fluid through the inflow of the installation. Accordingly, greater pressure is applied above the liquid 21 in the second vessel 22 than is applied above the liquid in the first-named vessel 1, and the liquid level in the second vessel falls while that in the first-named vessel 1 rises. Such condition is illustrated in the drawing. Openings 28 are formed in the bottom of the outer cylinder 2 to admit the liquid 21; and corresponding openings are formed in the top of the outer cylinder to facilitate rise of the liquid in the outer cylinder. Consequently, the liquid 21 surrounds the lower part of the inner cylinder 3 as illustrated in the drawings.

With the heating fluid or heat carrier flowing through the installation, not only is the air in the air spaces 25 and 27 expanded but the impeller 19 is rotated according to the rate of heat flow as explained above. Consequently, the permanent magnet 14 is rotated and in turn rotates the magnet 8 which rotates the inner cylinder 3. The liquid 21 which has risen to the level $h$, then forms a coupling between the cylinders 3 and 2, causing the latter to rotate with the former. Obviously, the higher the liquid rises between the two cylinders, the stronger is this coupling action and the greater the moment of rotation transmitted by the inner cylinder to the outer cylinder. Such action is therefore a function of the difference in temperature between the inflow and the outflow of the installation. Furthermore, the number of revolutions of the inner cylinder 3 in any given period of time is equal to or proportional to the number of revolutions of the impeller 19. Thus, both the volume of the delivered heating fluid or heat carried and the difference in temperature between its inflow and outflow are effective in the counting process carried on by the counter 13. It is necessary, however, for the number of rotations of the outer cylinder 2 in a given time also to be proportional to this difference in temperature. According to Newton's law, the torque transmitted by the inner cylinder 3 to the outer cylinder 2 is expressed by the formula $$M_1 = c_1(W_3 - W_2).h.\eta \qquad (1)$$

where $c_1$ is a constant, $W_2$ and $W_3$ the angular velocities of cylinders 2 and 3, $h$ the level of liquid above the bottom of the inner cylinder between the two cylinders, and $\eta$ the viscosity constant of the liquid. This driving moment of cylinder 2 is opposed by a brake moment $M_2$ exerted by the stationary wall of the vessel 1 on the cylinder 2 and correspondingly amounts to $$M_2 = -c_2.W_2.H.\eta \qquad (2)$$

where $H$ is the mutual height of the liquid above the bottom of the cylinder 2 between that cylinder and the stationary wall of the vessel 1. The speed of rotation of cylinder 2 always adjust itself so that $M_1 = -M_2$, leaving out of account the frictional forces in the counter which also exert a braking force, but which are smaller. We are thus faced by the fortunate circumstance that the viscosity of the liquid which greatly depends on temperature is eliminated, the number of rotations thus being independent of the room temperature.

From $M_1 = -M_2$ it follows that $$W_2 = \frac{c_1.h}{c_1.h + c_2 H} \cdot W_3 \qquad (3)$$

$H$ is composed of the constant $h_0 + h$ (Fig. 1), so that Equation 3 becomes $$W_2 = \frac{c_1.h}{c_3.h + c_4} \cdot W_3 \qquad (3a)$$

if the constants $c_1 + c_2$ are combined to $c_3$ and $h_0 \times c_2$ to $c_4$. To make $W_2$ become proportional both to the angular velocity $W_3$ and the difference in temperature $\Delta T$ between the inflow and outflow of the heat carrier, the condition equation $$\frac{c_1.h}{c_3.h + c_4} = \Delta T \qquad (4)$$

must be satisfied. This can be realized practically within the contemplation of the invention in different ways, for example by the cross section of the vessel 22 not being kept constant for its entire height, but being changed according to the height in consonance with a suitable function. If $h_1$ is the length to which the liquid 21 has dropped in the vessel 22, while it has risen in the vessel 1 by a length $h$, the difference of pressure on the surfaces of the liquid in the vessels 1 and 22 is $$\Delta p = \rho(h_1 + h) = c_5.\Delta T \qquad (5)$$

if $\rho$ is the density of the liquid and $c_5$ another constant. It follows from (4) and (5)

$$\Delta p = \rho(h_1 + h) = c_5 \frac{c_1.h}{c_3.h + c_4} = \frac{c_6.h}{c_3.h + c_4} \qquad (6)$$

if $c_1.c_5 = c_6$, and from this $$h_1 = h\left(\frac{c_6}{\rho(c_3.h + c_4)} - 1\right) \qquad (7)$$

As the volume of liquid entering the vessel 1 is always equal to the volume of liquid leaving the vessel 17 it holds good moreover, that $$F.h = \int_0^{h_1} F_1.dh_1 \qquad (8)$$

if $F$ is the free cross section of the liquid which is the same everywhere in vessel 22. If the expression resulting from (8) for $h$ is substituted in Equation 7, we obtain by graphic integration the magnitude of the cross section $F_1$ as a function of $h_1$, as the constants $c_3$, $c_4$, $c_6$ and $F$ are known from the dimension and the density $\rho$ of the liquid.

In a corresponding manner the proportion between the difference of temperature of the two air or gas-filled chambers 25, 27 and the number of rotations of the calorimeters can be established by keeping uniform the free cross section of vessel 22 along the height and increasing or decreasing the free cross section of the vessel 1 along the height $h$. The same effect may be attained by leaving constant the free cross sections of the two vessels along their heights and instead making variable the interspace between the cylinders 2 and 3 along the axis, which may be done in a manner similar to that shown above. Finally, it is possible to place in vessel 1 a special stationary brake cylinder 29 and form the cylindrical gap between the brake cylinder and the outer cylinder 2 in appropriate manner.

It is obvious that since the impeller is controlled by the volume of heat carrier, it may be optionally disposed either in the inflow or outflow portion of the heating installation.

A modification of the air or gas chambers 25, 27, hereinabove described may have flexible walls expanding and contracting in accordance with the temperature of the heat carrier and in which the pressure in the chambers is varied.

The forms of the invention herein described are presented merely as examples of how the invention may be embodied and applied. Other forms, embodiments and applications of the invention coming within the proper scope of the appended claims, will, of course, suggest themselves to those skilled in the art.

I claim:
1. A calorimeter for central heating installations adapted to measure the product of the volume of the heat carrier flowing through such installation and the temperature difference between the inflow and the outflow of such installation, said calorimeter comprising a gas-filled chamber in the inflow and in the outflow portions of such installation, two interconnected closed vessels connected to said chambers, an inner and outer cylinder mounted for rotation within the first vessel, the outer cylinder having openings communicating with said first vessel, a liquid partially filling said first and second vessels and said outer cylinder, an impeller disposed in the inflow portion of such installation provided with means for driving said inner cylinder, said outer cylinder being actuated by the liquid coupling said cylinders and a counting mechanism connected to said outer cylinder upon which the revolutions of said outer cylinder are registered.

2. A calorimeter for central heating installations adapted to measure the product of the volume of the heat carrier flowing through such installation and the temperature difference between the inflow and the outflow of such installation, said calorimeter comprising an impeller disposed in the inflow portion of such installation, a closed vessel, a second closed vessel communicating with said first vessel, a liquid partially filling said vessels, a closed gas-filled chamber disposed in the outflow portion of said installation, means for connecting said chamber to said first vessel, a second closed gas-filled chamber disposed in the inflow portion of said installation, means for connecting said second chamber to said second vessel, an inner and outer cylinder mounted for rotation within said first vessel, means for driving said inner rotatable cylinder by said impeller, said outer cylinder being formed with openings for communication with said first vessel, said liquid partially filling said outer cylinder to form a coupling between said inner and outer cylinders, a counting mechanism, means provided on said outer cylinder for driving said counting mechanism for registering the revolutions of said coupling force.

3. A calorimeter according to claim 2 in which said cylinders are arranged coaxially and a third stationary cylinder at least partly surrounding said first two cylinders, said third cylinder formed at least partly by the wall of said first vessel.

4. A calorimeter according to claim 3 in which said cross-section of the stationary cylinder is varied to compensate for any non-linearity of the curve of the number of rotations of said outer cylinder as a function of the difference of temperature.

5. A calorimeter according to claim 3 in which the free cross-section of said second vessel connected to said inflow is varied along its length.

6. A calorimeter according to claim 3 in which the diameter of at least one of said inner and outer cylinders is varied to provide a varied gap between said cylinders in the direction of the common axis of said cylinders.

7. A calorimeter according to claim 2 in which the transmission between the impeller and said inner cylinder is effected by a magnetic coupling.

8. A calorimeter according to claim 2 in which the height of said liquid within said vessels varies in proportion to the intensity of heat in the inflow of said heating installation.

9. A calorimeter according to claim 4 in which said outer cylinder is arranged to receive said liquid to substantially the bottom level of said inner cylinder whereby a rise of temperature exerting pressure upon said liquid level in said second vessel raises said liquid level within said outer cylinder to form a liquid coupling with said inner cylinder.

10. A calorimeter according to claim 1 wherein the air space of said first vessel is connected to said outflow chamber and the air space of said second vessel to said inflow chamber, the difference of pressures between said inflow and outflow exerted on said liquid providing the means for effecting said liquid coupling.

11. A calorimeter according to claim 1, wherein the air space of said first vessel is connected to said outflow chamber and the air space of said second vessel to said inflow chamber and wherein the level of said liquid varies according to the pressure generated in said chambers.

12. A calorimeter for central heating installations adapted to measure the product of the volume of the heat carrier flowing through such installation and the temperature difference between the inflow and the outflow of such installation, said calorimeter comprising an impeller disposed in the outflow portion of such installation, a closed vessel, a second closed vessel communicating with said first vessel, a liquid partially filling said vessels, a closed gas-filled chamber disposed in the inflow portion of said installation, means for connecting said chamber to said second vessel, a second closed gas-filled chamber disposed in the outflow portion of said installation, means for connecting said first chamber to said second vessel, an inner and outer cylinder mounted for rotation within said first vessel, means for driving said inner rotatable cylinder by said impeller, said outer cylinder being formed with openings at the top and bottom for communication with said first vessel, said liquid partially filling said outer cylinder to form a coupling between said inner and outer cylinders, a counting mechanism, means provided on said outer cylinder for driving said counting mechanism to register the revolutions of said coupling.

References Cited in the file of this patent
UNITED STATES PATENTS

| 606,749 | Uehling | July 5, 1898 |
| 1,868,623 | Blackie | July 26, 1932 |